United States Patent

[11] 3,602,046

| [72] | Inventors | Victor N. Lawford<br>Pasadena;<br>Anthony De Rosa, La Habra, both of, Calif. |
|---|---|---|
| [21] | Appl. No. | 740,299 |
| [22] | Filed | June 26, 1968 |
| [45] | Patented | Aug. 31, 1971 |
| [73] | Assignee | International Telephone & Telegraph Corporation<br>New York, N.Y. |

[54] SPECIFIC GRAVITY LINKAGE ADJUSTMENT FOR LIQUID LEVEL INDICATOR
1 Claim, 1 Drawing Fig.

[52] U.S. Cl.................................................... 73/299,
73/432 A
[51] Int. Cl...................................................... G01f 23/14
[50] Field of Search........................................... 73/432,
397, 299, 415, 417; 116/129 A; 74/96, 98, 110

[56] References Cited
UNITED STATES PATENTS

| 2,141,464 | 12/1938 | Gorrie | 74/110 X |
| 2,615,738 | 10/1952 | Johnson | 73/432 UX |
| 2,784,601 | 3/1957 | Booth | 74/96 |
| 2,989,870 | 6/1961 | Stahl | 73/415 X |

Primary Examiner—S. Clement Swisher
Attorneys—C. Cornell Remsen, Jr., Walter J. Baum, Paul W. Hemminger, Percy P. Lantzy and A. Donald Stolzy ABSTRACT: A linkage adjustment operable between a driving arm and a dial pointer to cause a pressure-sensitive liquid level indicator to read directly in the weight, volume, or other quantity of a liquid in a reservoir regardless of the specific gravity of the liquid. The linkage includes a pair of mutually pivoted links between the arm and pointer. A third link controls the mutual pivot of the other two links. The position of the third link is then made adjustable dependent upon the specific gravity of the liquid.

PATENTED AUG 31 1971 3,602,046
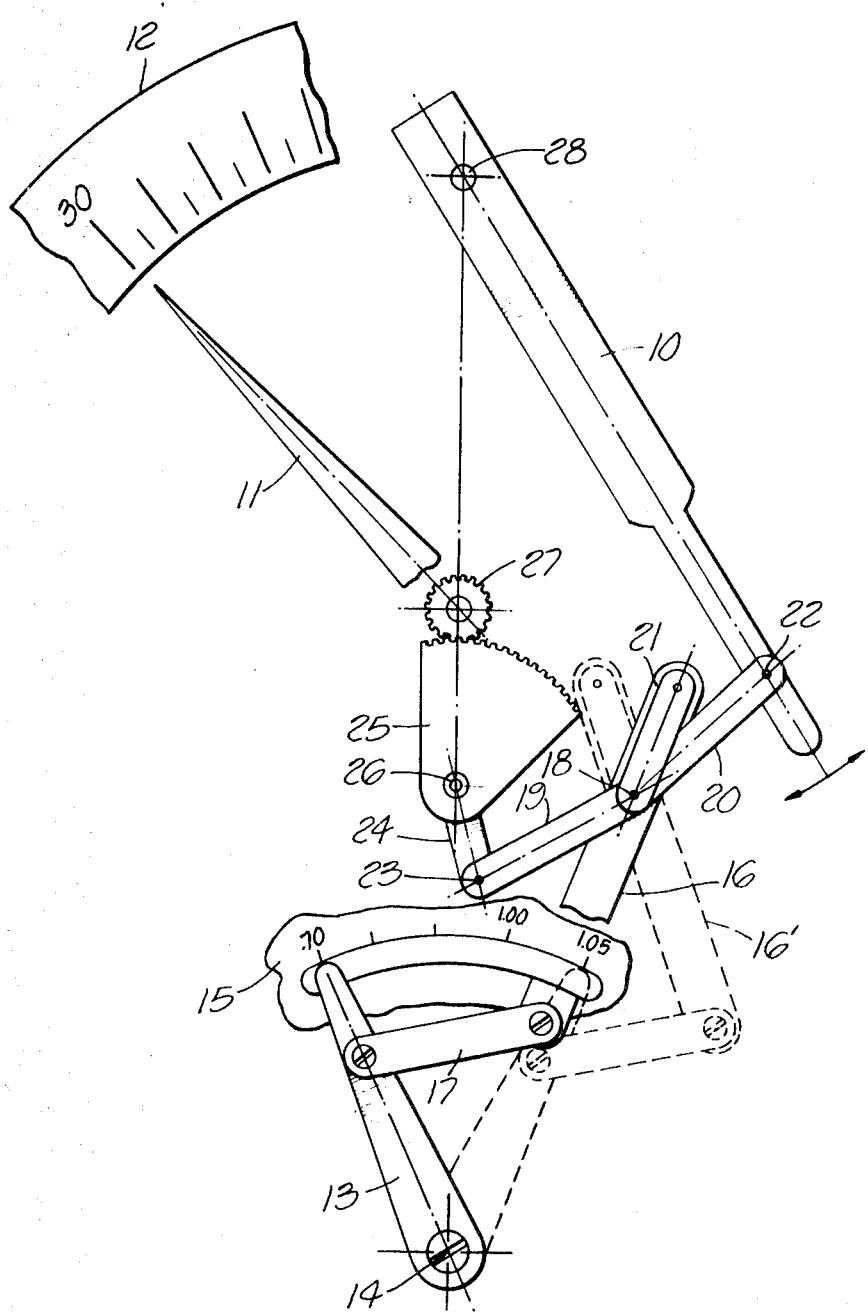
INVENTORS.
V. LAWFORD
A. DE ROSA
BY
ATTORNEY

SPECIFIC GRAVITY LINKAGE ADJUSTMENT FOR LIQUID LEVEL INDICATOR

BACKGROUND OF THE INVENTION

This invention relates to liquid level indicators, and more particularly to means for adjusting an indicator to read directly in the weight, volume, or other measure of a liquid in a reservoir.

In the past, it has been the practice to calibrate a gauge for a pressure-sensitive liquid level indicator to read in the amount of a liquid stored in a supply tank. However, such gauges can effectively be used with only one liquid.

SUMMARY OF THE INVENTION

In accordance with the device of the present invention, the above-described and other disadvantages of the prior art are overcome by providing a linkage adjustment between the driving arm and pointer of a pressure-sensitive liquid level indicator. The linkage adjustment is employed to shorten or lengthen the pointer movement relative to the arm movement. The gauge can thus be made to read directly in the quantity of any liquid within the specific gravity range of the instrument.

The above-described and other disadvantages of the invention will be better understood from the following description when considered in connection with the accompanying drawings.

BRIEF DESCRIPTION OF THE DRAWING

In the drawing, which is to be regarded as merely illustrative, the figure is a side elevational view of the linkage adjustment of the present invention.

DESCRIPTION OF THE PREFERRED EMBODIMENT

In the drawing, a drive arm is indicated at 10 which moves a pointer 11. Drive arm 10 is moved by a differential pressure unit to indicate the quantity of a liquid in a supply tank. The unit contains indicia at 12 with which pointer 11 cooperates to indicate the quantity of the liquid. The unit is adjusted so that dial 12 will read directly in the quantity of the liquid. The manner in which the instrument is set is as follows:

A link 13 is moved about a pivot axes 14 until link 13 points to the specific gravity of the liquid indicated at 15. Link 13 is connected to a link 16 through link 17. Link 16 is pivoted at 18 below the mutual pivot point of two links 19 and 20. Link 20 is pivoted from arm 10 at 22 to link 19 at 18. Link 19 is pivoted at 23 from an arm 24. Arm 24 is fixed to a gear 25 that is pivoted at 26. A pinion 27 lies in mesh with gear 25. Pointer 11 is fixed to pinion 27.

In the operation of the linkage adjustment of the present invention, drive arm 10 rotates about an axis 28 through an angular extent approximately 8 degrees, more or less. The effective length of the two linkages 19 and 20 is adjusted by moving link 13. Link 16 is maintained in the position shown in solid lines when the specific gravity of the liquid is 0.70. Link 16 is maintained in the position indicated in dotted lines when the specific gravity of the liquid is 1.05.

In accordance with the foregoing, it will be appreciated that pointer 11 will cooperate with dial 12 to read directly in the quantity of the liquid in the supply tank. The link 13 may thus be moved to accommodate a liquid of any specific gravity. The instrument therefore, is not limited for use to one specific liquid.

What is claimed is:

1. A specific gravity linkage adjustment for a liquid level indicator, said adjustment comprising: a driving arm; pointer means; first and second links connected between said arm and said pointer means, said first link being pivoted to said arm at one end and pivoted to said second link at the other end; a third link to guide the mutual pivot of said first and second links; and linkage means to adjust the position of said third link, said pointer means including a pinion and a gear in mesh with said pinion, said second link being pivoted relative to said gear, said pointer means also including a fourth link fixed to said gear, said second link being pivoted on said fourth link, said linkage means including a fifth link pivoted to said third link, a sixth link pivoted to said fifth link, and a seventh link pivoted to said sixth link and at a fixed position.